(12) United States Patent
Meriac et al.

(10) Patent No.: US 10,873,642 B2
(45) Date of Patent: Dec. 22, 2020

(54) METHODS OF ACCESSING A REMOTE RESOURCE FROM A DATA PROCESSING DEVICE (71) Applicant: ARM IP Limited, Cambridge (GB)

(72) Inventors: Milosch Meriac, Cambridge (GB); Geraint David Luff, Cambridge (GB)

(73) Assignee: ARM IP Limited, Cambridge (GB)

( * ) Notice: Subject to any disclaimer, the term of this patent is extended or adjusted under 35 U.S.C. 154(b) by 201 days.

(21) Appl. No.: 15/527,077

(22) PCT Filed: Oct. 26, 2015

(86) PCT No.: PCT/GB2015/053208
§ 371 (c)(1),
(2) Date: May 16, 2017

(87) PCT Pub. No.: WO2016/079467
PCT Pub. Date: May 26, 2016

(65) Prior Publication Data
US 2018/0183889 A1   Jun. 28, 2018

(30) Foreign Application Priority Data
Nov. 18, 2014   (GB) .................................. 1420468.9

(51) Int. Cl.
*G06F 15/173* (2006.01)
*H04L 29/08* (2006.01)
(Continued)

(52) U.S. Cl.
CPC .............. *H04L 67/26* (2013.01); *G06F 9/541* (2013.01); *G06F 9/546* (2013.01); *G06F 9/547* (2013.01);
(Continued)

(58) Field of Classification Search
CPC .................................. H04L 67/26; G06F 9/541
(Continued)

(56) References Cited

U.S. PATENT DOCUMENTS 5,761,309 A * 6/1998 Ohashi ................. G06Q 20/341
713/156
8,538,020 B1 * 9/2013 Miller ................... H04L 9/0825
380/255
(Continued)

FOREIGN PATENT DOCUMENTS

CN        103959706        7/2014
EP        2 194 692        6/2010

OTHER PUBLICATIONS

First Office Action for CN Application No. 201580062543.9 dated Mar. 2, 2020 and English translation, 20 pages.
(Continued)

*Primary Examiner* — Duyen M Doan
(74) *Attorney, Agent, or Firm* — Nixon & Vanderhye P.C.

(57) ABSTRACT

Methods of accessing a remote resource from a data processing device A method of accessing a remote resource from a data processing device for providing a rich user interface on a client device, the method comprising: pushing, from the data processing device, a first type of data comprising user interface resources to the remote resource; generating, on the data processing device, a second type of data comprising operational data relating to the operation of the data processing device; pushing from the data processing device, the second type of data, to the remote resource.

18 Claims, 6 Drawing Sheets

(51) Int. Cl.
*G06F 16/955* (2019.01)
*G06F 9/54* (2006.01)
*G06F 21/60* (2013.01)
*H04L 12/24* (2006.01)

(52) U.S. Cl.
CPC ........ *G06F 16/9566* (2019.01); *G06F 21/602* (2013.01); *H04L 41/22* (2013.01); *H04L 67/146* (2013.01)

(58) Field of Classification Search
USPC .................................................. 709/203, 226
See application file for complete search history.

(56) References Cited

U.S. PATENT DOCUMENTS

| | | | |
|---|---|---|---|
| 2007/0168522 A1 | 7/2007 | Van Halen, III | |
| 2007/0245027 A1* | 10/2007 | Ghosh | H04L 29/12594 709/228 |
| 2008/0320310 A1* | 12/2008 | Florencio | H04L 63/0428 713/184 |
| 2009/0222823 A1* | 9/2009 | Parkinson | G06F 9/466 718/101 |
| 2010/0216392 A1 | 8/2010 | Barkley et al. | |
| 2010/0287267 A1* | 11/2010 | Jin | G06F 9/5038 709/223 |
| 2011/0145863 A1 | 6/2011 | Alsina et al. | |
| 2011/0173550 A1* | 7/2011 | Oetzel | G06F 3/04817 715/757 |
| 2012/0124372 A1* | 5/2012 | Dilley | H04L 63/0471 713/162 |
| 2013/0109003 A1* | 5/2013 | Lee | G06Q 90/00 434/362 |
| 2014/0005809 A1 | 1/2014 | Frei et al. | |
| 2014/0047322 A1 | 2/2014 | Kim et al. | |
| 2014/0237937 A1 | 8/2014 | Song et al. | |
| 2016/0037332 A1* | 2/2016 | Egeler | H04N 21/4131 455/420 |
| 2016/0381201 A1* | 12/2016 | Park | H04W 4/70 455/557 |

OTHER PUBLICATIONS

Partial Search Report for PCT/GB2015/053208 dated Jan. 28, 2016, 8 pages.
International Search Report and Written Opinion of the ISA for PCT/GB2015/053208 dated May 11, 2016, 17 pages.
Search Report for GB1420468.9 dated Jun. 1, 2015, 5 pages.

\* cited by examiner

```
        Site secret
        {                         ┌── Secret applies to all subpaths of /data
            "scope": "/data",  ◄──┘
            "url": {
How to  ┌─      "secret": {"data": "a secret string", "encoding": "plain"},
encode ─┤       "hmac": "SHA256",
URL     │       "template": "/data/{hex:22}"
        └─  },
            "content": {
How to  ┌─      "key": {
encode  │           "data": "another secret string",
document┤           "encoding": "plain"
content │       },
        │       "encryption": "AES192"
        └─  },
            "keyExpansionUrl": "https://..." ◄── Where to go for more site secrets
        }
```

METHODS OF ACCESSING A REMOTE RESOURCE FROM A DATA PROCESSING DEVICE

This application is the U.S. national phase of International Application No. PCT/GB2015/053208 filed Oct. 26, 2015 which designated the U.S. and claims priority to GB Patent Application No. 1420468.9 filed Nov. 18, 2014, the entire contents of each of which are hereby incorporated by reference.

The present techniques relate to the field of data processing. More particularly, the techniques relate to communications between a data processing device and a remote resource.

Cloud computing services are becoming more common. More and more data processing device devices are being connected to the cloud, for example as part of the "Internet of Things".

Such devices, hereinafter referred to as "IoT devices" include temperature sensors, healthcare monitors, fitness devices and smart pens, to name but a few, which can be connected to the cloud so that they can be accessed and controlled using remote systems. For example, the IoT devices may generate data which a user wishes to access using a remote device.

The present technique seeks to improve access to data generated by an IoT device.

The description provided below and the accompanying figures are intended to illustrate the functions of the present embodiments, and the sequence of steps for constructing and operating the present embodiments. It is not intended to represent the only forms in which the present example may be constructed or utilized. However, the same or equivalent functions and sequences may be accomplished by different examples.

Figure 1:
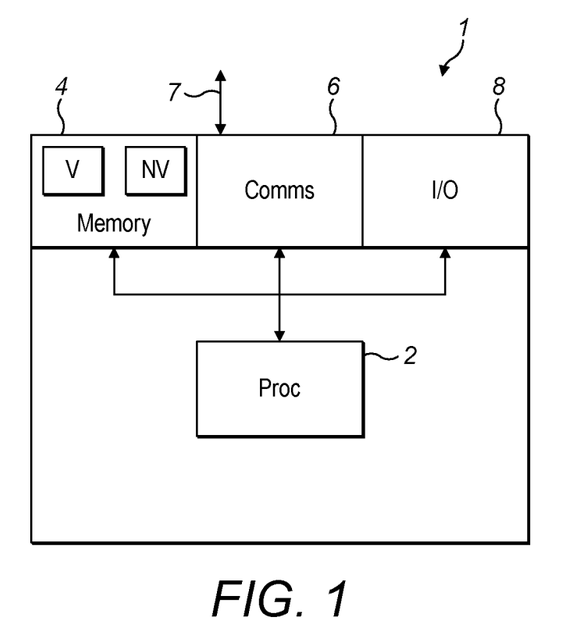
FIG. 1 schematically shows an example of an IoT device.

FIG. 1, schematically shows an example of an IoT device 1.

The circuitry illustrated in FIG. 1 includes processing circuitry 2 coupled to memory circuitry 4 e.g. volatile memory (V)/non-volatile memory (NV), such as such as flash and ROM.

The memory circuitry 4 may store programs executed by the processing circuitry 2, as well as data such as UI resources, time-series data, credentials (e.g. cryptographic keys) and/or identifiers for a remote resource(s) (e.g. URL, IP address).

The IoT device 1 may also comprise communication circuitry 6 including, for example, near field communicating (NFC), Bluetooth Low Energy (BLE), WiFi, ZigBee or cellular circuitry (e.g. 3G/4G) for communicating with the remote resource(s)/device(s) e.g. over a wired or wireless communication link 7. For example, the IoT device 1 may connect to remote resource(s)/device(s) within a local mesh network over BLE, which in turn may be connected to the internet via an ISP router.

The IoT device 1 may also comprise input/output (I/O) circuitry 8 such as sensing circuitry to sense inputs (e.g. via sensors (not shown)) from the surrounding environment and/or to provide an output to a user e.g. using a buzzer or light emitting diode(s) (not shown). The IoT device 1 may generate operational data based on the sensed inputs, whereby the operational data may be stored in memory 4. The I/O circuitry 8 may also comprise a user interface e.g. buttons (not shown) to allow the user to interact with the IoT device 1.

The processing circuitry 2 may control various processing operations performed by the IoT device 1 e.g. encryption of data and/or transformation of URLS, communication, processing of applications stored in the memory circuitry 4.

The IoT device 1 may also comprise a display e.g. an organic light emitting diode (OLED) display (not shown) for communicating messages to the user.

The IoT device 1 may generate operational data based on the sensed inputs. Although, the IoT device 1 may comprise large scale processing devices such as a tablet computer or mobile telephone, often the IoT device 1 comprises a relatively small scale data processing device having limited processing capabilities, which may be configured to perform only a limited set of tasks, such as generating operational data and pushing the operational data to a remote resource.

For example, the IoT device 1, may, for example, be an embedded device such as a healthcare monitor, which generates operational data related to a user's health such as heart rate, blood sugar level and/or temperature.

Alternatively, the IoT device 1 may, for example, be an embedded temperature sensor, which generates operational data based on the temperature of the surrounding environment, and may, for example be generated as a time series.

Alternatively, the IoT device 1 may, for example, be a smart-watch comprising a fitness band which generates data relating to movement of a user, for example capturing distance walked/run/swam by a user, or elevation ascended/descended by a user.

In further embodiments, the IoT device 1 may, for example, be a smart-pen, configured to generate operational data relating to the movement of the pen by the user, for example alphanumeric characters or pictures. The IoT device 1 may also be configured to create files such as JPEG/Vector (e.g. SVG)/Portable Document Format (PDF) recording the specific movements.

It will be appreciated that the IoT device 1 may comprise other hardware/software components not described herein depending on the specific function of the IoT device 1. For example, in the case of a smart-pen, the IoT device 1 may comprise an infra-red camera to capture and record movement, and/or a microphone to record audio and to generate sound files for example as Advanced Audio Coding (AAC), MP3 or MP4 files.

Figure 2:
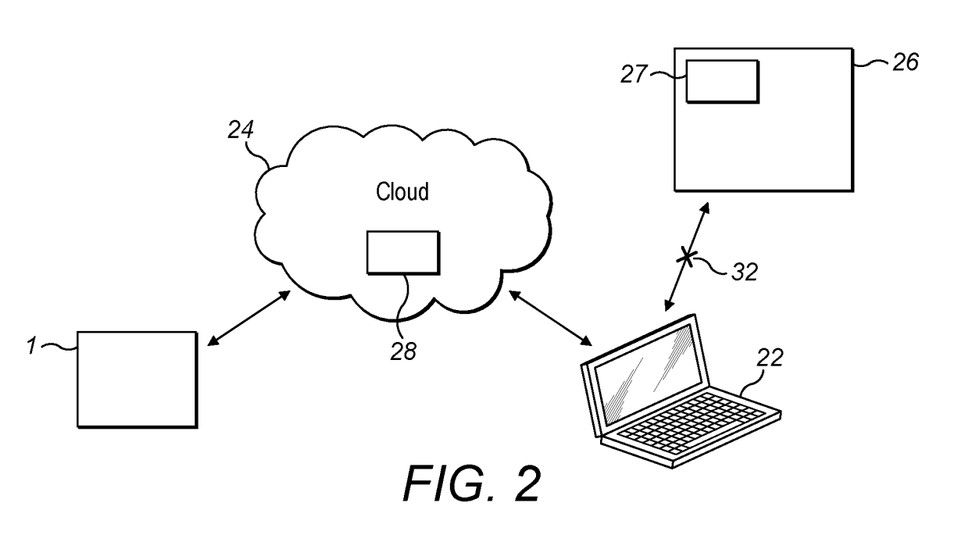
FIG. 2 schematically shows an example of a client device in communication with a remote resource.

FIG. 2 schematically shows an example of a client device 22 in communication with a remote resource 24 and a server 26 to display data from the server 26 and remote resource 24 to a user when the present techniques are not applied.

The client device 22 may, for example, be a laptop which receives user interface (UI) data 27 from the server 26, which belongs and is maintained by a website provider, whereby the UI data 27 defines the appearance of a website displayed within a browser on the laptop.

The UI data 27 may comprise for example, UI resources, such as Cascading Style Sheets (CSS) files, Hypertext Mark-up Language (HTML), JavaScript etc.

The UI data 27 also points to the location of a separate remote resource 24 located on the internet which stores operational data 28, for example time-series data generated by the IoT device 1, which is posted to the remote resource 24 by the IoT device 1.

On receiving the UI data 27, the client device 22 then fetches the operational data 28 from the remote resource 24.

Alternatively, the UI data 27 from the server 26 may point to the IoT device 1, and the client device 22 is used to connect directly to the IoT device 1 to fetch the operational data therefrom. The client device 22 processes the data 27, 28 from the server 26 and the remote resource 24 and displays all, or a selection, of the data 27, 28 to the user as part of a rich UI on the client device 22.

When fetching the UI data 27 from the server 26, the request will be satisfied with a latency depending on number of factors, including, for example the distance between the client device 22 and the server 26. It will be appreciated that in order to decrease latency related issues, the servers 26 should be located as close to the client device 22 as possible. For example, a website provider may provide multiple servers across multiple jurisdictions e.g. Europe, America, China to serve users across the different jurisdictions, so as to decrease latency when satisfying requests for the users in the different jurisdictions around the world. Such a configuration is expensive due to the requirement of multiple servers and the upkeep/maintenance thereof.

Furthermore, when fetching the operational data from the IoT device 1 directly, the request will be satisfied with a high latency, as a result of, for example, the communication circuitry on the IoT device 1 and the limited bandwidth thereof (e.g. due to using BLE, or the limited processing power). Such high latency will impact the user experience. Furthermore, IoT devices may not be active at all times, and so, the client device 22 will have to wait until the IoT device 1 becomes active before fetching the data, which will also impact the user experience.

It will be appreciated that in order to provide a rich UI, the client device 22 is dependent on receiving the UI data 27 from the server 26 in order to locate and fetch the operational data 28, either from the remote resource 24 or directly from the IoT device 1. Therefore, the user is dependent on the website provider maintaining the server 26 with the UI data 27. For example, if the user purchases an IoT smart-pen band from SmartPenUK Ltd, the user relies on SmartPenUK Ltd to maintain the UI data on the website server to which the user connects.

If the website provider ceases trading, then the server 26, and/or the UI data 27 stored thereon will be inaccessible to the client device 22 (as illustrated by the arrow 32), and, therefore, the client device 22 will be unable to fetch the operational data 28 from the remote resource 24 or directly from the IoT device 1.

Figure 3:
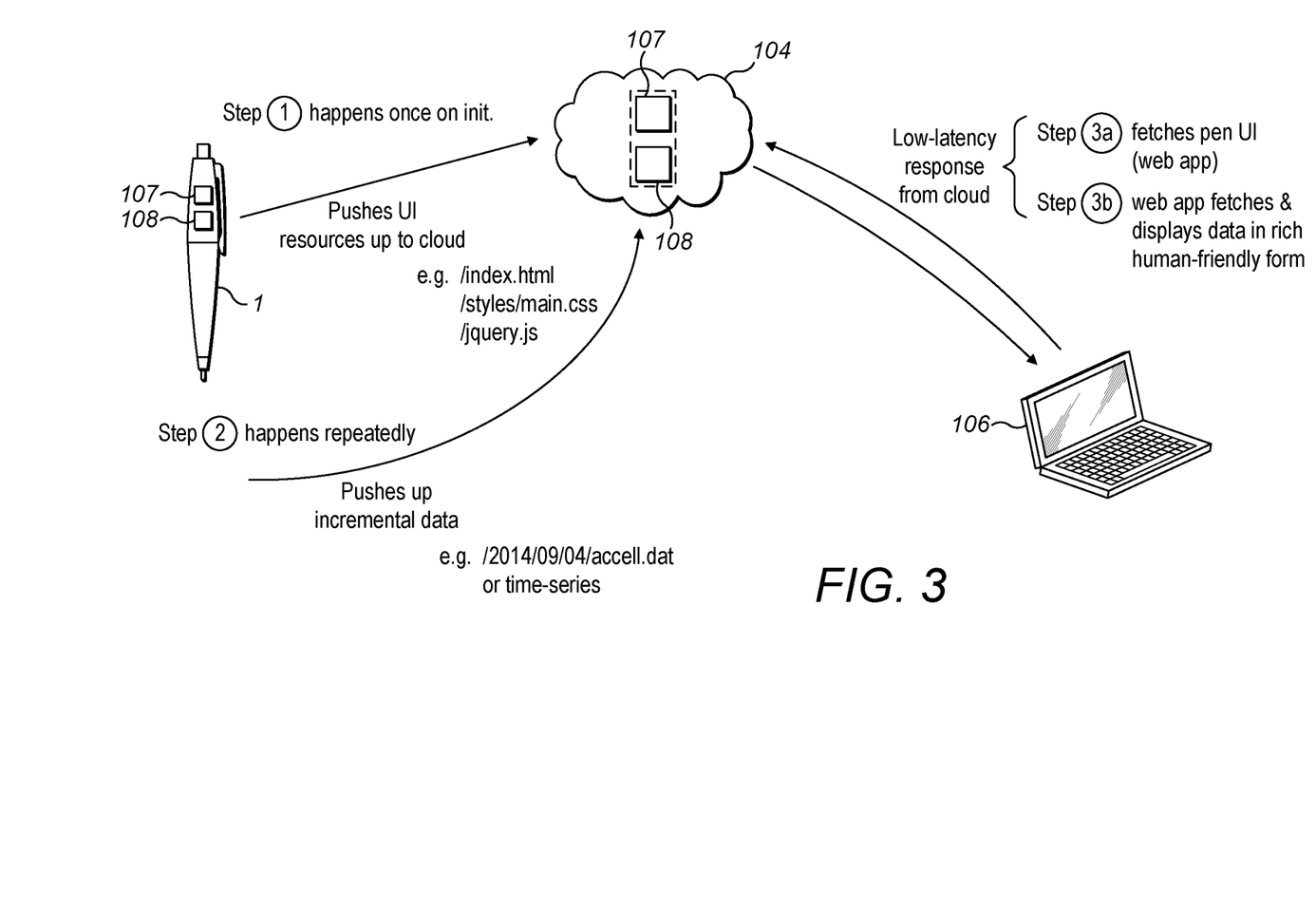
FIG. 3 schematically shows an example of a client device in communication with a remote resource according to an embodiment.
Figure 4:
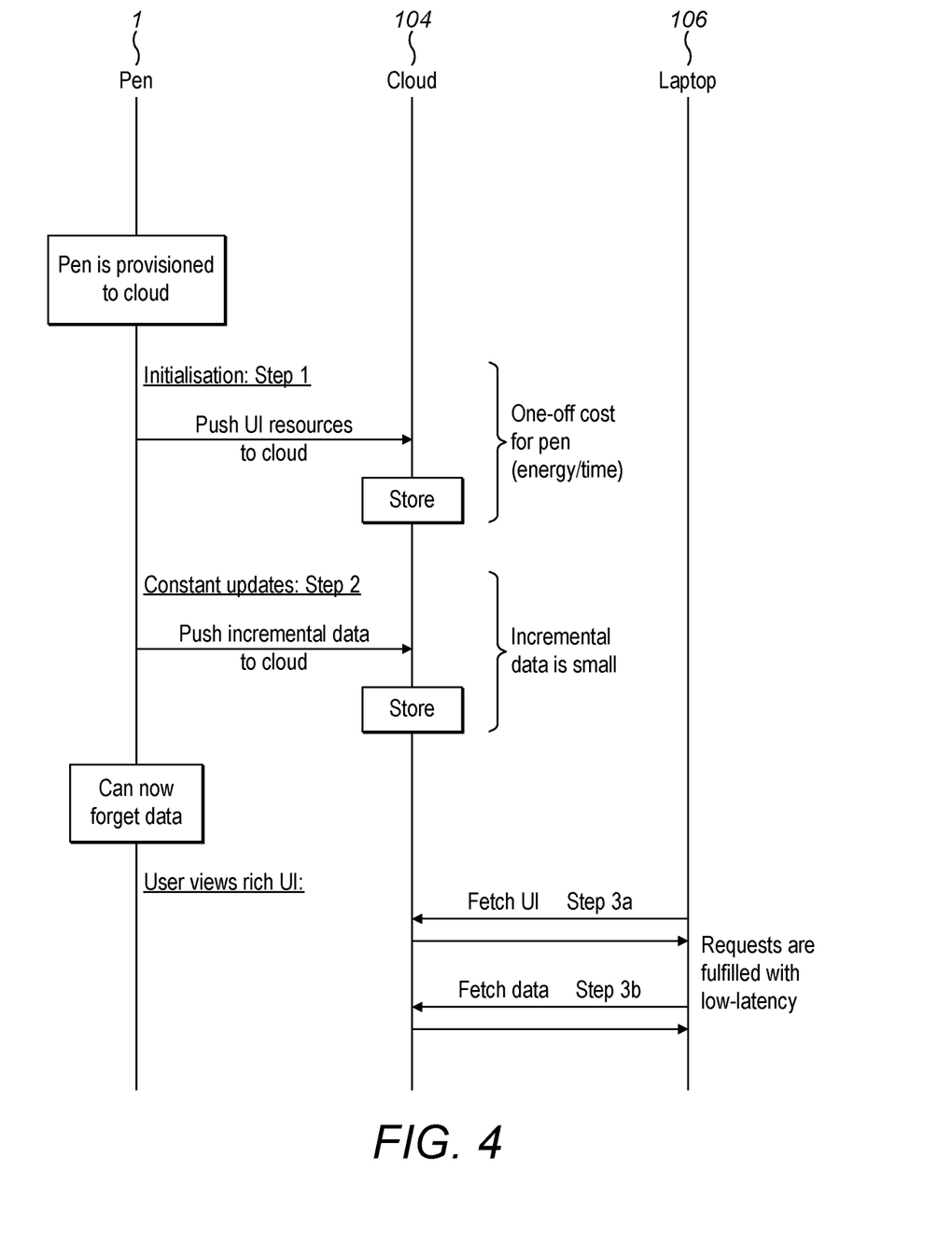
FIG. 4 schematically shows a communication mechanism between an IoT device, the client device and the remote resource.

FIG. 3 schematically shows an example of client device 106 in communication with a remote resource 104 when the present techniques are applied, whilst FIG. 4 schematically shows a communication mechanism between an IoT device 1, the client device 106 and the remote resource 104.

In the present example, the IoT device 1 is depicted as a smart-pen, although the IoT device 1, may be any suitable data processing device.

In the present example, the client device 106 is depicted as a laptop but it will be appreciated that the client device 106 may be a desktop, a tablet, mobile phone or any suitable data processing device which is capable of displaying data to a user e.g. through a browser.

In the present example the remote resource 104 is a cloud server, but it will appreciated that the remote resource 104 may comprise any suitable data processing device or embedded system which can be accessed from another platform such as a remote computer, content aggregator or cloud platform which receives data posted by the IoT device 1. In some examples, the remote resource 104 may be a cache.

In the present example, the IoT device 1 is pre-provisioned with a first type of data 107 in memory (not shown in FIG. 3 or 4). Such pre-provisioning may occur at manufacture. In the present example, the first type of data 107 comprises UI resources for defining what the user views on the client device. Such UI resources may define a website or web-service and may include Cascading Style Sheets (CSS) files, Hypertext Mark-up Language (HTML, HTML 5), JavaScript (JS), applications (e.g. IoS application), web applications and/or flash data. In some examples, such data may be considered static content, which may be updated on the IoT device 1 on an ad-hoc basis e.g. by a user downloading new first type of data onto the IoT device 1.

In the present example, the IoT device 1 is configured to connect with remote resource 104 to push data thereto, whereby, for the example, the IoT device 1 may be provided with the connectivity data (e.g. a location identifier (e.g. an address URL)) and credential data (e.g. a cryptographic key, certificate, a site secret) of the remote resource 104.

In the present example, on initialisation, e.g. powering on for the first time, the IoT device 1 undertakes a registration process with remote resource 104 and pushes the first type of data 107 to the remote resource 104 (e.g. to an address on the remote resource identified by a URL such as, for example: . . . /living_room/pen/ui), whereby the first type of data 107 is stored/cached at the remote resource 104 (Step 1).

It will be appreciated that the IoT device 1 may connect to the remote resource 104, e.g. via the internet, using one or more nodes/routers in a network e.g. a mesh network (not shown in FIG. 3). The IoT device 1 may connect to the nodes/routers using any suitable method, for example using Bluetooth Low Energy, ZigBee, NFC, WiFi.

In alternative embodiments, a user may specify to which remote resource the IoT device 1 should push data. For example, the user may connect the IoT device 1 directly to a client device 106 e.g. via universal serial bus (USB), and install code capable of executing on the IoT device 1, whereby the code may comprise connectivity data and/or credential data relating to the remote resource with which the user wants the IoT device 1 to communicate. The connectivity data and/or credential data may be provided to the IoT device 1 using any suitable method e.g. via USB/BLE. The credential data may also comprise credential data relating to a network to which the IoT device 1 may be required to connect e.g. WPA2 key for pairing with nodes in a WiFi network.

The remote resource 104 may confirm receipt on receiving the first type of data 107, for example, by providing a summary data e.g. a hash value representative of the first type of data 107 to the IoT device 1, whereby the summary data may be signed by the remote resource 104 (e.g. using a cryptographic key, such as a private key of the remote resource). The IoT device 1 may then verify the signature of the remote resource 104 e.g. using a public key of the remote resource 104 pre-provisioned on the IoT device 1, and may also verify the summary data. If the verification of the signature/summary data fails, the IoT device 1 may alert the user e.g. by activating an LED on the IoT device in a particular sequence.

It will be appreciated that the length of time taken to the push the data from the IoT device 1 to the remote resource 104 will depend on various factors, including the size of the data, the device bandwidth, the communication circuitry available and the associated communication protocols used to push the data.

In the present example, the IoT device 1 is configured to generate a second type of data 108 relating to the operation of the smart-pen as described previously.

The IoT device 1 is configured to store the second type of data 108 within memory provided therein, and communicate with the remote resource 104 to push the second type of data thereto (Step 2).

For example, the IoT device 1 may push the second type of data 108 to a location on the cloud-server 104 identified by a URL (e.g . . . /living_room/pen/write_summary). Alternatively, the second type of data may be pushed to the remote resource 104, without first being stored in memory on the IoT device 1. For example, the second type of data 108 may be real-time critical or low-bandwidth data.

By caching the first type of data at the remote resource 104, the IoT device 1 is not required to repeatedly push the first type of data to the remote resource. Therefore, once the first type of data is cached at the remote resource 104, the bandwidth available for pushing the second type of data from the IoT device 1 is increased.

In the present example, the second type of data 108 may be pushed to the remote resource 104 periodically on an incremental basis, e.g. after a defined time period e.g. every 1 second, minute, hour or day etc. as required by a user.

For example, the IoT device 1 may be configured to automatically push the second type of data 108 to the remote resource 104 on a continuous basis when the second type of data is generated, when connectivity to the remote resource 104 is available.

Additionally or alternatively, the IoT device 1 may be configured to push the second type of data 108 to the remote resource 104 when a certain memory threshold on the IoT device 1 is reached e.g. if the IoT device 1 comprises 6 Gigabytes (GB) of memory, and it has generated 4 GB of the second type of data 108 which is stored in memory on the IoT device 1, the IoT device 1 may be configured to push all the second type of data in memory to the remote resource 104 if connectivity with the remote resource 104 is available. If connectivity to the remote resource 104 is not available, the IoT device 1 may issue a warning to the user to indicate that a threshold has been reached or that the second type of data 108 in memory is approaching the threshold but that connectivity is unavailable, such that the user may address any connectivity issues.

Therefore, it will be appreciated that the IoT device 1 can send data dependant on its bandwidth and further dependant on a connection being available. It can send data, even if not specifically requested by a remote device 104.

The remote resource 104 may confirm receipt on receiving the second type of data 107, for example, by providing a summary data e.g. a hash value representative of the second type of data 107 to the IoT device 1, whereby the summary data may be signed by the remote resource 104 (e.g. using a cryptographic key associated with remote resource such as a private key or shared key). The IoT device 1 may then verify the signature of the remote resource 104 e.g. using a public key of the remote resource 104, or a corresponding shared key, pre-provisioned on the IoT device 1, and may also verify the summary data. If the verification of the signature/summary data fails, the IoT device 1 may alert the user e.g. by activating an LED on the IoT device 1 in a particular sequence known to the user.

On verifying receipt of the second type of data 108 by the remote resource 104, the IoT device 1 may erase the second type of data 108 which was sent to the remote resource 104 from its memory. Such functionality ensures that data sent to the remote resource 104 can be deleted from the IoT device 1 in the knowledge that the data is stored at the remote resource 104, such that data will not be erased from the IoT device 1 without first being stored on the remote resource 104.

A user wishing to access the data at the remote resource may do so using client device 106. In an illustrative example, the user may connect to the remote resource 104 using a browser on the client device 106, whereby, for example, clicking a link in the browser will cause the client device 106 to fetch the first type of data from the remote resource 104, which in the present example is a web-application (Step 3a).

The web-application will start in the browser on client device 106 and cause the client device 106 to fetch the second type of data 108 from the remote resource 104 (Step 3B). The web application will process the fetched data to provide a rich UI to the user on the client device 106, whereby the rich UI comprises the first and second types of data presented in a human friendly form. For example, the rich UI may comprise banners, logos, multimedia, animations, interactive features and/or whereby the rich UI is updated in real-time as further data (e.g. further operational data) is fetched from the remote resource 104 as it becomes available after been pushed from the IoT device 1.

In some embodiments, the client device 106 may download an application (e.g. an IoS application) from the remote resource 104, which was pushed to the remote resource 104 from the IoT device 1, whereby the application is executed on the client device 106 to control fetching and processing of the second type of data to provide a rich UI.

In some embodiments, processing of the fetched first and second type of data may be undertaken at the remote resource 104, e.g. using a server side scripting language such as Hypertext Preprocessor (PHP) whereby the user is presented with a rich UI on the client device 106.

In some embodiments, the client device 106 may obtain data (first and/or second type of data) from the remote resource 104 on request by a user. Additionally or alternatively, the client device 106 may be synced with the IoT device 1, whereby the IoT device 1 may inform the client device 106 that the data was pushed to the remote resource 104, such that the client device 106 can fetch data from the remote resource 104.

For example, the IoT device 1 may have connectivity data relating to the client device 106 provisioned thereon, whereby the IoT device 1 transmits a signal (e.g. a ping or cryptographic nonce) to the client device 106, to inform the client device 106 that the data was pushed to, and is available, at the remote resource 104. The availability of the data at the remote resource 104, may, for example, be confirmed at the IoT 1 device by verification of the signature/summary data received from the remote resource 104 as discussed previously, after which the signal is transmitted. It will be appreciated that the signal will be known to the client device 106 as indicating that the data is available.

Additionally or alternatively, the remote resource 104 may be configured to inform the client device 106 that data has been pushed thereto from the IoT device 1 and is available for fetching by the client device e.g. by transmitting a signal to the client device 106.

In some embodiments, the client device 106 may communicate with the IoT device 1, e.g. by sending a signal (e.g. a ping or cryptographic nonce) to the IoT device 1 to request that the IoT device 1 upload any data which, for example, is stored in its memory, to the remote resource 104. It will be appreciated that the signal will be known to the IoT device 1 as indicating that the data is requested to be pushed.

Using the functionality described above, the user will be provided with a rich UI on the client device 106, whereby the first and second type of data are fetched from the remote resource 104 by the client device 106.

Using the present technique, as the UI resources and operational data is pushed from the IoT device 1 to the remote resource 104, a client device 106 can obtain all data required to provide a rich UI directly from a single remote resource 104, without having to access multiple resources, or without having to request the data directly from the IoT device 1.

Furthermore, the user will be provided with a rich user experience with lower latency than in comparison to if the client device 106 was required to communicate with multiple remote resources, or directly with the IoT device 1.

Furthermore, the user is not reliant on a particular service provider maintaining a remote resource in order to access UI resources/operational data generated by the user's IoT device. For example, if the user purchases an IoT pen from SmartPenUK Ltd, the user does not need to rely on SmartPenUK Ltd maintaining a dedicated website server to access the user's data because the UI data and operational data can be pushed/uploaded from the IoT device 1 to the remote resource 104, and accessed from client device.

Furthermore, it will be appreciated that because the IoT device 1 pushes both the first and second type of data to the remote resource 104, the user can connect to multiple remote resources e.g. cloud servers hosted by different providers, and upload the different types of data thereto such that the user is not reliant on one particular remote resource or service provider. Furthermore, the user can set up a dedicated cloud server.

Furthermore, the IoT device 1 may download updated UI resources e.g. via USB when connected to a client device 106, such that, if the UI resources are updated by a manufacturer, the IoT device 1 is capable of obtaining the latest UI resources to push to the remote resource 104.

Therefore, the above techniques allow simple IoT devices to appear to be rich devices, whereby client devices communicate with the remote resources associated with the IoT device to provide a rich user experience via a rich UI on the client device using data comprising UI resources and operational data pushed to the remote resource by the IoT devices.

Figure 5:
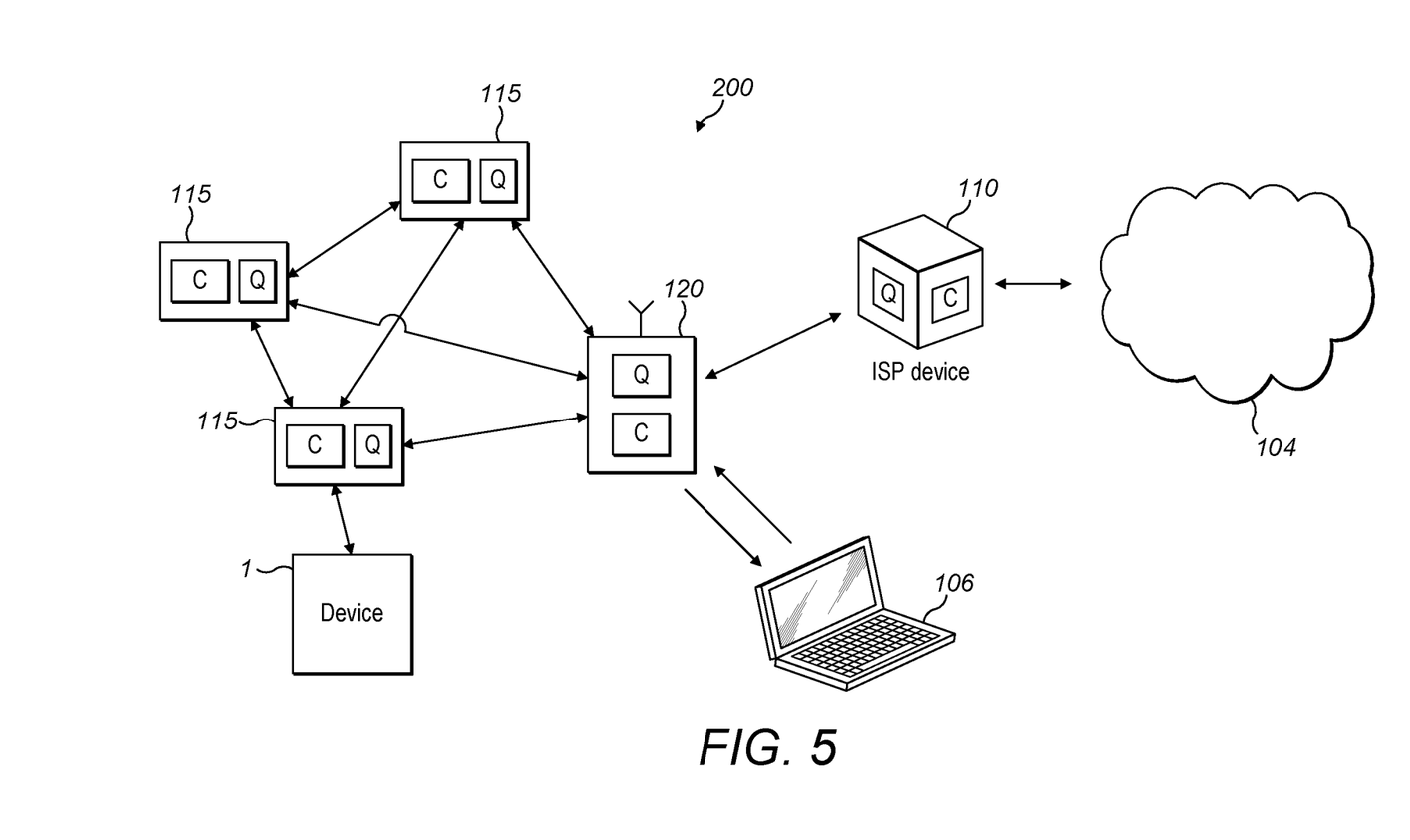
FIG. 5 schematically shows a further example of the client device in communication with the remote resource according to a further embodiment.

FIG. 5 schematically shows a further example of the client device 106 in communication with the remote resource 104 in a network 200 in which data transmitted to remote resource 104 from the IoT device 1 may be cached at different nodes within the network 200. It will be appreciated that the network 200 may comprise a mesh network (e.g. WiFi, Zigbee, BLE)

In the present example, the remote resource 104 is a cloud server hosted, for example on the internet.

The IoT device 1 may communicate with the remote resource 104 using various intermediate devices, e.g. intermediate network nodes, such as device nodes 115 (for example, light bulbs, smoke alarms), local routers 120, and/or internet service provider (ISP) devices 110 within the network 200 (e.g. via BLE, WiFi, Zigbee).

Client devices 106 as described above may also communicate with the remote resource 104 via the intermediate network nodes 110, 115 and/or 120.

It will be appreciated that FIG. 5 is a schematic and that the network 200 may be implemented using any suitable configuration.

Each of the intermediate network nodes 110, 115, 120 may also comprise a cache (C) (e.g. flash memory) for caching data transmitted between the IoT device 1 and the remote resource 104.

In an illustrative example, some intermediate network nodes may have a reduced cache capacity in comparison to other intermediate network nodes. For example, device nodes 115 may have a smaller cache (C) than local router 120, which in turn may have a smaller cache (C) than the ISP device 110.

As data (first type or second type of data) is pushed up to the remote resource 104 from the IoT device 1, the intermediate network nodes may cache the data, such that a request for data from the client device 106 may be satisfied by an intermediate network node 110, 115, 120 having the data cached thereon.

Therefore, whilst it may appear to the IoT device 1 that it is pushing data to the remote resource 104, the data may be cached by more or more intermediate network nodes 110, 115, 120. Furthermore, whilst it may appear to the client device 106 that it is fetching data from the remote resource 104, the request may be satisfied by one or more intermediate network nodes 110, 115, 120.

For example, the client device 106 may request second type of data from the cloud server 104 but the ISP device 110 may have the data subject to the request stored in a cache (C) thereon, and will provide the cached data to the client device 106, thereby satisfying the request.

Alternatively or additionally the local router 120 may satisfy the request for data from a cache (C) provided therein. It will be appreciated that data provided by an intermediate node will be provided with less latency in comparison to data retrieved from the remote resource 104. Such functionality provides for reduced latency in fulfilling requests, thereby improving the user experience.

In some examples, the various intermediate network nodes may receive and transmit data using different protocols, e.g. using BLE, WiFi, ZigBee, and/or Ethernet.

In some examples, the intermediate network nodes may broadcast a communication (e.g. via WiFi, BLE) announcing that the data uploaded from the IoT device 1 is available within a cache (C) provided thereon, whereby a device receiving the broadcast communication (e.g. the client device 106) may actively connect to the intermediate network node and fetch the data stored in the cache (C). Alternatively, an intermediate network node may announce that it comprises the cached data when a device attempts to connect thereto e.g. via a pairing or discovery process.

The IoT device 1 may push data to the intermediate network nodes within the network 200 using a first protocol such as BLE, whereby the data may be pushed, from the intermediate network nodes to another device, using a different protocol, for example WiFi, Zigbee and/or Ethernet.

As such, it will be appreciated that the cached data may be retrieved from the intermediate network nodes using a different protocol from which it was pushed to the intermediate network nodes. As such, whilst the data (first or second types) may be uploaded to the intermediate network nodes using a protocol having a relatively low bandwidth, the data may be retrieved from the intermediate network nodes using a different protocol having a relatively higher bandwidth and with lower latencies. Such functionality provides improved user experience, and further enables devices to communicate with each other even if they do not have compatible communication protocols.

For example, if IoT device 1 is configured to communicate over BLE only, and the client device 106 is configured to communicate over WiFi only, the IoT device 1, may push data to an intermediate network node 110 via BLE, whereby the client device 106 may retrieve data from the intermediate network node 110 via WiFi. Therefore, the IoT device 1 and client device 106 may communicate with each other via the intermediate network nodes even though the respective communication protocols on the devices are not mutually supported.

In some embodiments, the intermediate network nodes 110, 115, 120 may comprise a transaction queue (Q), such that if the IoT device 1 is not active when the client device 106 sends a transaction signal to the IoT device e.g. a signal requesting data be uploaded, the transaction signal may be stored in the queue (Q).

Therefore, when active, the IoT device 1 can query a queue (Q) in one of the intermediate network nodes for transactions signals from the client device 106, whereby the transaction signal can trigger an action by the IoT device 1 e.g. to upload data to the remote resource 104.

The queues(s) may also be used to store signals transmitted from the IoT device 1 to the client device 106 to inform the client device 106 that data is available from the remote resource 104 as described above, whereby the client device 106 can query the queue in one of the intermediate network nodes for transaction signals from the IoT device 1 and, for example, fetch data from the remote resource 104 if the transaction signal indicates that data was pushed to the remote resource 104.

By providing a queue(s) (Q) in the intermediate network nodes, the IoT device 1 can receive requests from the client device 106, and push data to the remote resource 104 asynchronously. Furthermore, the client device 106 can receive signals from the IoT device and fetch data from the remote resource 104 asynchronously. Therefore, there is no requirement for the IoT device 1 and client device 106 to be active simultaneously.

In some embodiments the queues may be encoded, e.g. whereby, for example, the transaction signals are encrypted by the device issuing the transaction signals, and may be decrypted by the device fetching the transaction signals. Any suitable encryption standard may be used, for example, AES-128 AES-192 or AES-256.

Alternatively, access to the transaction queues may be restricted to certain devices, e.g. by permissions associated with the device. For example, it may be that transaction queues (Q) are restricted to receiving transaction signals from the client device 106 only, and configured to not store transaction signals from any other device.

In some embodiments, the data (first and/or second type of data) may be encrypted by the IoT device 1 before pushing the data to the remote resource 104 (e.g. using a cryptographic key), whereby it may be decrypted by a device having a corresponding cryptographic key). Any suitable encryption standard may be used, for example, AES-128 AES-192 or AES-256.

When cached on the intermediate network nodes, the encrypted data will not be accessible to devices not having the corresponding cryptographic key. Therefore, if a device without a corresponding key receives a broadcast from an intermediate network node, it will not be possible for the device to decrypt the data without the corresponding key.

However, even if the data 107, 108 is encrypted, the fact that the IoT device pushes data to intuitive/known addresses identified by an identifier such as a URL, for example, in the case of a smart-pen to " . . . /living_room/pen/write_summary" or for example in the case of a temperature sensor to, " . . . /kitchen/temperature_sensor/temp_summary", then it may be possible for parties such as the cloud provider, the Internet service provider (ISP) or an attacker to derive personal information from the identifier even if the data itself is encrypted.

For example, the parties may infer from the example identifiers above that the user owns a smart-pen or temperature sensor, and may use that information to target the owner of the IoT device e.g. with advertisements for sales or an attacker may attempt to send malware to a specific type of IoT device known to be easily compromised etc.

Figure 6A:
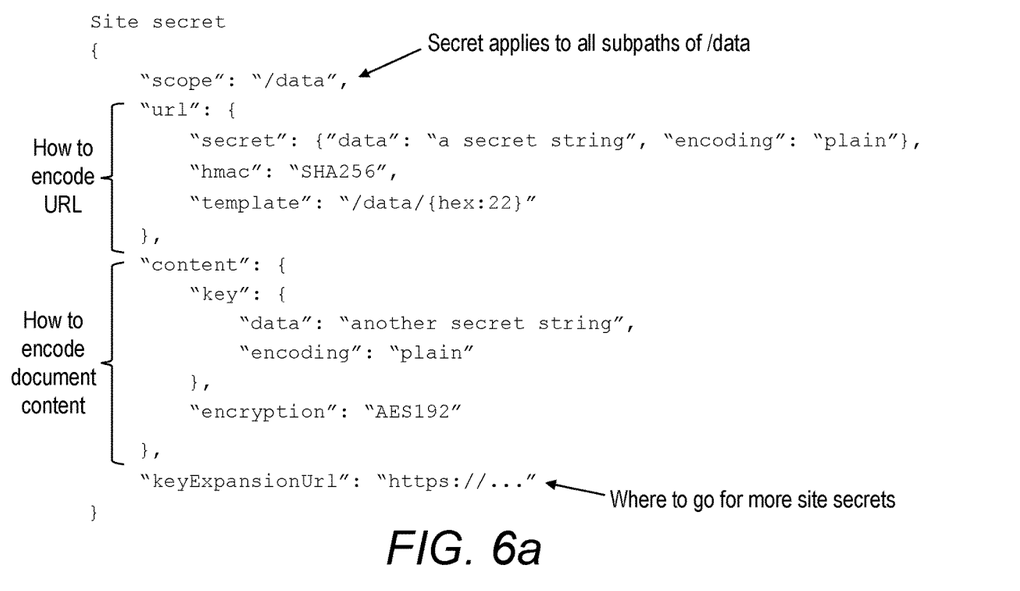
FIG. 6a schematically shows an example of a site secret for the remote resource.

To address this issue in some embodiments the IoT device 1 may be provided with secret information as shown in FIG. 6a.

This secret information is collectively referred to as a "site secret," which can be used to disguise/transform the address of the location to which the IoT device 1 pushes data, or disguise/transform the address of the location from which the client device 106 fetches data.

Figure 6B:
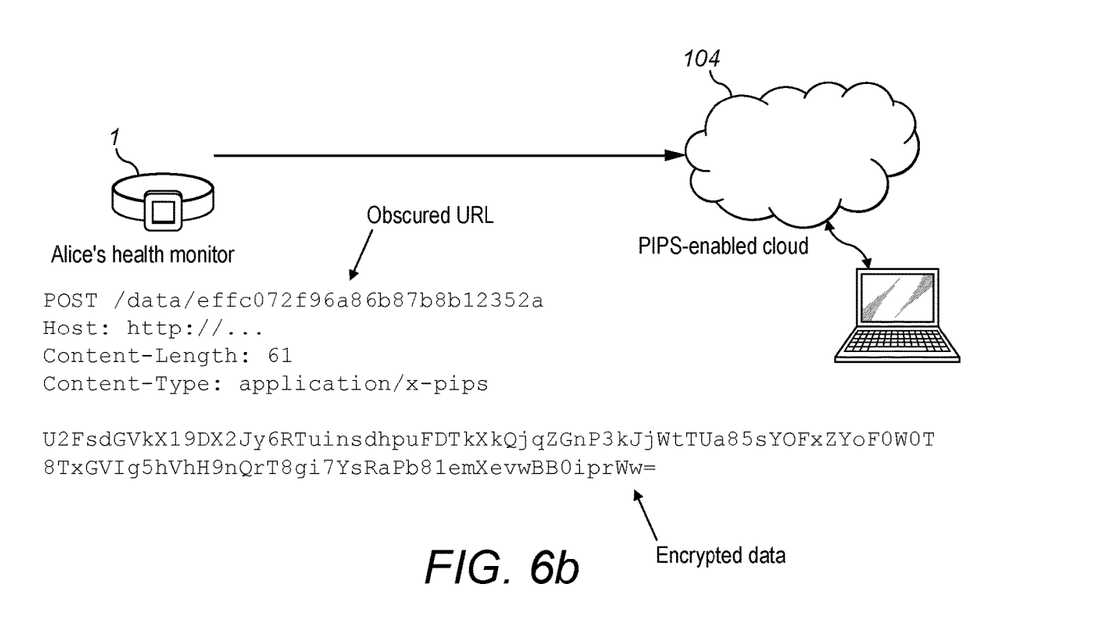
FIG. 6b schematically shows an example of accessing the resource the resource at an obscured URL generated using the site secret.

The site secret may be provided in memory of the IoT device 1 for a particular URL ("first URL) and/or for a particular user/device as part of the connectivity data, alternatively the site secret may be provided on the client device 106. FIG. 6b shows an example of accessing the remote resource 104 at an obscured URL generated using the site secret.

The IoT device 1 or the client device 106 may use the first URL to identify the destination to which the data is to be pushed or fetched respectively, which, in the present example is a location on the remote resource 104, however the first URL does not identify the actual location of the remote resource 104.

The site secret is used by the IoT device 1 or client device 106 for mapping/transforming the first URL into a different obscured URL which is then used to identify the actual destination on the remote resource 104, as only the obscured URL needs to be exposed to the network.

The site secret also includes URL encoding information which specifies how to generate the obscured URL of the remote resource 104.

As shown in FIG. 6a, the site secret includes a scope which specifies the remote resources to which the site secret applies. In the present example, the scope portion indicates paths or sub-paths of the resources to which the site secret applies. In the present example, the site secret applies to the path "/data". The site secret may also apply to all sub-paths of the path indicated in the scope. Hence, accesses to resources not within the specified path (including sub-paths) may not succeed.

In the present example, the URL encoding information includes a secret string to be used as a key for transforming the first URL into the obscured URL, data defining a transformation to use for generating an encoded string for the obscured URL (e.g. SHA256) and a template URL into which the encoded string can be inserted to form the obscured URL.

SHA256 is a one-way transformation, which means that even if the secret string (key) is known, it is not possible to use the key to transform the obscured URL back into the first URL. Other transformations may also be used (e.g. md5 or other SHA algorithms, CRC32) In this example, the template is "klata/{hex:22}", which means that a 22-character truncated string generated based on the SHA256 algorithm is inserted into the template to create the obscured URL. The string to be inserted into the template may be a truncated version of the actual result of the transformation (it is not essential to use all bits of the encoded string in the URL). In other examples, the full string generated by the hash algorithm may be used.

The site secret may also comprise content encryption information defining how to encode data to be sent to the remote resource 104. In the present example the AES192 algorithm may be used for encryption, although any suitable encoding may be used.

As such, instead of pushing data (first type and second type) to the first URL, from which parties may infer sensitive information, the IoT device 1 may push data to an obscured URL, and whereby the data may be encrypted, so that both the data and the URL correspond to an unintelligible string of characters which does not allow for inference of any information, sensitive or otherwise by parties not privy to the site secret or the encryption information.

Figure 7:
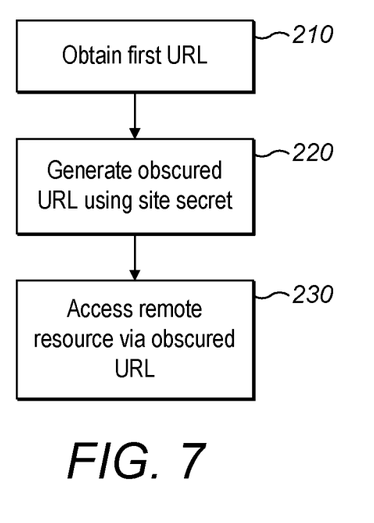
FIG. 7 schematically shows a method of accessing the remote resource from the client device.

FIG. 7 shows a method of accessing the remote resource 104 from the client device 106, whereby the remote resource 104 comprises data thereon at an obscure URL, whereby, in the present example, the data was pushed thereto by IoT device 1.

At step 210, a first URL corresponding to the remote resource 104 is obtained by the client device 106. The first URL may be obtained, for example, by the user typing in a URL into a browser, the user clicking a link in an email or website, reading a pre-stored URL, or accessing a fixed URL embedded into the client device e.g. by the user. At step 220, the site secret corresponding to the first URL is used to generate the obscured URL. At step 230, the remote resource is accessed using the obscured URL and the data fetched therefrom by the client device 1.

The obscured URL may be generated by the client device 106 using any suitable method. For example, the generation of the obscured URL may be implemented using embedded functionality, using code which is part of a browser, or other software executed by the device 106, or using a browser plugin, applet or JavaScript obtained by a third party.

It will be appreciated that the site secret allows the first URL to be mapped to the corresponding obscured URL, so that the first URL need not be known to the devices on the network other than the client device 106 and IoT device 1.

Parties not privy to the site secret (e.g. cloud provider, ISP, attacker etc.) will not be able to access or infer information from the data 107, 108 even though the cloud provider may own the remote resource 104 on which the data 107, 108 is stored, and the communication infrastructure though which the data 107, 108 is transmitted.

Therefore, because a user does not have to be concerned about privacy in relation to the remote resource 104, it's possible to push first type of data (such as UI resources) and second type of data (such as energy usage data generated by a temperature sensor; heart beat data generated by a health monitor; activity data generated by a fitness band, diary entries generated by a smart-pen) to a remote resource in a safe and secure manner.

In the present example, the user may access the data on the remote resource 104 using, for example, a web application running within a browser on the client device 106.

The client device 106 will be aware of the first URL and the site secret and the information required to decrypt the data. Such data may be provided over the internet, e.g. by obtaining from a website owned by a manufacturer of the IoT device 1, on registration of the client device 106 with the website, and cached on the client device 106 for future use.

In the present example, an application running within the browser transforms the first URL into the obscured URL using the site secret, fetches the data from the remote resource 104, and decrypts the data once the data is fetched, such that the application can process the data and provide a rich UI for the user through the browser.

In a first aspect there is provided a method of accessing a remote resource from a data processing device for providing a rich user interface on a client device, the method comprising: pushing, from the data processing device, a first type of data comprising user interface (UI) resources to the remote resource; generating, on the data processing device, a second type of data comprising operational data relating to the operation of the data processing device; pushing from the data processing device, the second type of data, to the remote resource, whereby the remote resource may be a cache.

The method may further comprise: obtaining a first identifier corresponding to the remote resource to which the first or second type of data is to be pushed; obtaining secret data corresponding to the first identifier; generating an obscured identifier at the data processing device using the secret data corresponding to the first identifier, wherein the obscured identifier is for obtaining the actual location of the remote resource; pushing the first or second types of data to the remote resource using the obscured identifier.

The first identifier comprises a first uniform resource locator (URL), wherein the obscured identifier comprises an obscured URL. The obscured URL may be generated by performing a transformation of the first URL into the obscured URL using the secret data.

The method may further comprise: encrypting, at the data processing device, the first type of data, and/or encrypting, at the data processing device, the second type of data.

In a further aspect there is provided a data processing device comprising: processing circuitry configured to perform data processing; communication circuitry configured to communicate with a remote resource; memory circuitry configured to store a first type of data comprising user interface (UI) resources; and input/output circuitry configured to generate a second type of data comprising operational data; wherein the processing circuitry is configured to: obtain a first identifier corresponding to the remote resource from memory; control the communication circuitry to access the remote resource using the first identifier; push the first type of data to the remote resource; and push the second type of data to the remote resource.

The data processing device may be configured to generate an obscured identifier using secret data corresponding to the first identifier, wherein the obscured identifier is for obtaining the actual location of the remote resource and wherein the processing circuitry may be configured to encrypt the first and second types of data.

In a further aspect there is provided a method of accessing a remote resource from a client device for providing a rich user interface on the client device, the method comprising: pushing, from a data processing device, a first type of data comprising user interface resources to the remote resource; pushing from the data processing device, a second type of data, to the remote resource; fetching, at the client device, the first and second type of data from the remote resource;

displaying the first and second type of data within a user interface associated with the client device.

The method may further comprise: obtaining at the data processing device, a first identifier corresponding to the remote resource to which the first or second type of data is pushed; obtaining secret data corresponding to the first identifier; generating, at the data processing device, an obscured identifier using the secret data corresponding to the first identifier, wherein the obscured identifier is for obtaining the actual location of the remote resource; pushing, from the data processing device, the first or second type of data to the remote resource using the obscured identifier.

The method may further comprise: obtaining at the client device, a first identifier corresponding to the remote resource to which the first or second type of data is pushed; obtaining secret data corresponding to the first identifier; generating, at the client device, an obscured identifier using the secret data corresponding to the first identifier, wherein the obscured identifier is for obtaining the actual location of the remote resource; fetching, by the client device, the first or second type of data from the remote resource using the obscured identifier.

The method may further comprise: encrypting, at the data processing device, the first and/or second type of data and/or decrypting, at the client device, the first and/or second type of data.

The method may further comprise: caching the first and/or second type of data pushed to the remote resource at an intermediate network node between the data processing device and the remote resource, wherein if the first and/or second type of data stored at the remote resource is available at the intermediate network node, then the data is provided to the client device from the intermediate network node if requested by the client device.

The intermediate network node may be one of a plurality of intermediate network nodes, wherein at least one of the plurality of intermediate network nodes may comprise a transaction queue for queuing transactions to be sent to the data processing device, and wherein the data processing device pulls transactions from the transaction queue when it is ready to process the transactions.

The client device and the data processing device may communicate asynchronously using the transaction queue.

In a further aspect there is provided, a method of accessing a remote resource from a client device for providing a rich user interface on the client device, the method comprising: fetching, at the client device, a first type of data comprising UI resources from the remote resource; fetching, at the client device, a second type of data comprising operational data from the remote resource; displaying the first and second type of data within a user interface associated with the client device.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. A method of accessing a remote resource from a data processing device for providing a rich user interface on a client device, the method comprising:
   transmitting, from the data processing device, a first type of data comprising user interface (UI) resources to the remote resource;
   generating, on the data processing device, a second type of data comprising operational data relating to the operation of the data processing device;
   obtaining a first identifier corresponding to the remote resource to which the first or second type of data is to be transmitted;
   obtaining secret data corresponding to the first identifier;
   generating an obscured identifier at the data processing device using the secret data corresponding to the first identifier, wherein the obscured identifier is for obtaining the actual location of the remote resource; and
   transmitting, from the data processing device, the first or second types of data to the remote resource using the obscured identifier.

2. A method according to claim 1, wherein the first identifier comprises a first uniform resource locator (URL).

3. A method according to claim 2, wherein the obscured identifier comprises an obscured URL.

4. A method according to claim 3, wherein the obscured URL is generated by performing a transformation of the first URL into the obscured URL using the secret data.

5. A method according to claim 1, further comprising:
   encrypting, at the data processing device, the first type of data.

6. A method according to claim 1, further comprising:
   encrypting, at the data processing device, the second type of data.

7. A data processing device comprising:
   processing circuitry configured to perform data processing;
   communication circuitry configured to communicate with a remote resource;
   memory circuitry configured to store a first type of data comprising user interface (UI) resources; and
   input/output circuitry configured to generate a second type of data comprising operational data;
   wherein the processing circuitry is configured to:
   obtain a first identifier corresponding to the remote resource from memory to which the first or second type of data is to be transmitted;
   obtain secret data corresponding to the first identifier;
   generate an obscured identifier at the data processing device using the secret data corresponding to the first identifier, wherein the obscured identifier is for obtaining the actual location of the remote resource;
   control the communication circuitry to transmit the first type of data to the remote resource the first or second types of data to the remote resource using the obscured identifier.

8. The data processing device of claim 7, wherein the processing circuitry is configured to encrypt the first and second types of data.

9. A method of accessing a remote resource from a client device for providing a rich user interface on the client device, the method comprising:
   obtaining a first identifier corresponding to the remote resource to which a first type of data or a second type of data is to be transmitted;
   obtaining secret data corresponding to the first identifier;
   generating an obscured identifier using the secret data corresponding to the first identifier, wherein the obscured identifier is for obtaining the actual location of the remote resource;
   transmitting the first type of data comprising user interface resources to the remote resource using the obscured identifier;

transmitting the second type of data to the remote resource using the obscured identifier;
fetching the first and second type of data from the remote resource; and
displaying at least the second type of data within a user interface associated with the client device.

10. A method according to claim 9, wherein the obtaining the first identifier is at the data processing device and the generating the obscured identifier is at the data processing device.

11. A method according to claim 9, the method further comprising:
obtaining, at the client device, a second identifier corresponding to the remote resource from which the first or second type of data is to be fetched;
obtaining secret data corresponding to the second identifier;
generating, at the client device, the obscured identifier using the secret data corresponding to the second identifier; and
fetching, by the client device, the first or second type of data from the remote resource using the obscured identifier.

12. A method according to claim 11, further comprising:
encrypting, at the data processing device, or decrypting, at the client device, the first and/or second type of data.

13. A method according to claim 9, further comprising:
caching the first and/or second type of data transmitted to the remote resource at an intermediate network node between the data processing device and the remote resource.

14. The method according to claim 13, wherein if the first and/or second type of data stored at the remote resource is available at the intermediate network node, then the data is provided to the client device from the intermediate network node if requested by the client device.

15. The method according to claim 13, wherein the intermediate network node is one of a plurality of intermediate network nodes.

16. The method according to claim 15, wherein at least one of the plurality of intermediate network nodes comprises a transaction queue for queuing transactions to be sent to the data processing device.

17. The method according to claim 16, wherein the data processing device pulls transactions from the transaction queue when it is ready to process the transactions.

18. The method according to claim 17, wherein the client device and the data processing device communicate asynchronously using the transaction queue.

* * * * *